July 23, 1968   R. E. BAILEY   3,394,184
MANUFACTURE OF MONOMETHYLHYDRAZINE
Filed June 25, 1964
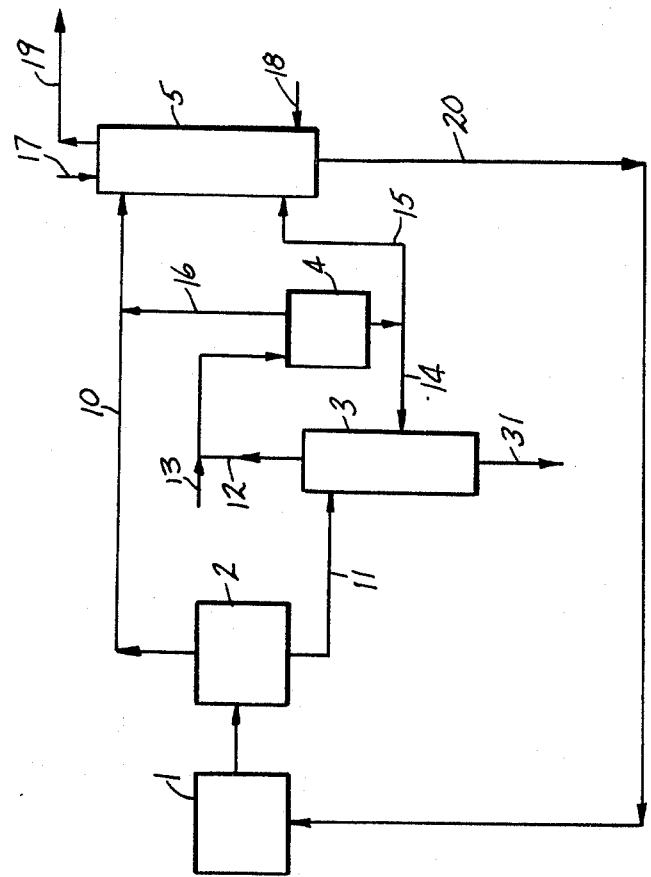
INVENTOR.
RANDAL E. BAILEY
BY
AGENT 3,394,184
MANUFACTURE OF MONOMETHYLHYDRAZINE
Randal E. Bailey, Orange, Conn., assignor to Olin
Mathieson Chemical Corporation, a corporation of
Virginia
Filed June 25, 1964, Ser. No. 378,012
7 Claims. (Cl. 260—583)

ABSTRACT OF THE DISCLOSURE

In the manufacture of monomethylhydrazine (MMH) by the modified Raschig process and recovery of MMH from the synthesis liquor, a substantially anhydrous process stream containing unreacted ammonia ($NH_3$), monoethylamine (MMA) and minor amounts of azomethane (AZM) is admixed with water and fractionally distilled to separate AZM overhead and to prevent accumulation of AZM in explosive amounts in the process stream of recovered unreacted MMA and water.

---

This invention relates to improvements in the manufacture of monomethylhydrazine (MMH) from monomethyl amine (MMA) and chloramine. More particularly the invention relates to improvements effecting increased yields of MMH, provides for disposal of dangerous by-products unavoidably formed in the synthesis reaction and provides a purified stream of recovered unreacted MMA suitable for recycle.

The manufacture of substituted hydrazines containing lower alkyl groups is described in the art, for example, in Italian Patent No. 562,653 issued May 16, 1957. Aqueous chloramine is formed by the reaction of sodium hypochlorite and ammonia and is further reacted with an alkyl amine to form the substituted hydrazine. For example, the process of preparing monomethylhydrazine from monomethyl amine reacted with chloramine in aqueous solution is described by Knight, Petroleum Refiner, February 1962, pp. 179–184. In additioin to the principal products there described, however, certain by-products are formed. In small scale operations in the laboratory and particularly in batch operations, although the yields are not as high as desirable, the formation of by-products presents no serious hazard. In continuous operation on a large scale, the recovery and recycle of unreacted materials is desirable to make the process more economically feasible. The formation of even minor proportions of by-products presents problems. Provision must be made for the separation and disposal of by-products which otherwise accumulate in the recycle streams causing contamination of the principal product and eventually causing shutdown of the process. When one or more of the by-products has explosive properties, the accumulation of such by-products can eventually make the process inoperative. The commercial operation of the above-identified modified Raschig process for the manufacture of monomethylhydrazine (MMH) produces various by-products in the synthesis mixture including azoalkanes, particularly azomethane but also possibly azoethane and azomethanoethane. Azo methane (AZM) has positively been identified as the explosive impurity formed in the synthesis streams when MMH is prepared from chloramine and monomethyl amine (MMA) in aqueous solution. The azoalkanes have violently explosive properties and must be separated and discharged from the operation in order to make commercial operation of the process feasible. The azoalkanes are not apparently formed in the manufacture of hydrazine or any unsymmetrical dialkyl-hydrazines by the Raschig or modified Raschig process. However, the present invention is directed to a method of removing azoalkanes from the synthesis streams in which it is present regardless of the process of manufacture of the substituted hydrazines or by whatever mechanism such azoalkanes are formed. As used in the present specification and claims, the term azomethane or AZM is intended to include the azoalkanes found in any of these synthesis streams.

The aquous MMH synthesis mixture usually contains somewhat less than 1 percent of MMH and from one to 1000 p.p.m., commonly 10 to 50 p.p.m. of AZM among other components. These quantities of AZM can be ignored in small scale operations but not in large scale operations, especially in continuous operations involving recovery and recycle of MMA. Removal of azoalkanes from the recycle streams is essential to safe operation.

The process of the present invention provides means for separating and removing the AZM from the synthesis liquor and recycle streams. This effectively prevents accumulation of AZM in the recovery system and the explosive consequences of such accumulation. The invention thus provides for safely recovering an aqueous MMA stream substantially free of AZM and suitable for recycle to the MMH synthesis as well as an MMH stream suitable for safe operations for the recovery of MMH.

In the known process for the recovery of MMH, dissolved gases including nitrogen and other fixed gases together with minor amounts of ammonia, MMA and AZM are first separated from the synthesis liquor which contains substantially all of the AZM, MMA, ammonia, MMH and other less volatile by-products or contaminants, if present, for example salts, including sodium chloride or potassium sulfate. The synthesis liquor is then distilled at substantially atmospheric pressure up to about 50 p.s.i.g. to separate it into a first overhead stream containing substantially all of the AZM, MMA and ammonia. A first bottoms stream is produced containing substantially no MMA or ammonia but containing substantially of the MMH and sodium chloride or other non-volatiles present.

According to the process of this invention, water is add to the first overhead stream and the separation of AZM by fractional distillation from MMA is readily accomplished. Fractionation of the anhydrous mixture is not readily accomplished since AZM boils at only 8° C. above MMA at atmospheric pressure. If the AZM is not removed and the anhydrous stream is recycled, the AZM accumulates in the system and eventually explodes.

Water can be added to the first overhead stream in any convenient form or manner and the resulting mixture is subsequently fractionated to remove AZM overhead and to recover an aqueous stream as bottoms which can safely be recycled to the synthesis step since it is substantially free of AZM. The water can be added as liquid water or steam or both and can be introduced into the first overhead stream before condensation or in the subsequent fractionation or both.

The first overhead stream is not readily condensable at atmospheric temperatures and pressures since it consists largely of ammonia and MMA. Water is conveniently added to the first overhead stream as steam, but alternatively liquid water is sprayed into the condenser or water is introduced by other suitable means to render the mixture condensable at atmospheric temperatures and low pressures. The condensate of aqueous ammonia, AZM, and MMA are charged to a second stage together with the stream of fixed gases. With the introduction of water as reflux and open steam heating into the second stage, AZM and ammonia pass overhead as a second overhead stream to waste or recovery while aqueous MMA is removed as a second bottoms stream which is recycled to the MMH synthesis operation.

The first overhead stream contains, besides major proportions of ammonia and MMA, substantially all of the azomethane from the synthesis liquor. The AZM is present in the ammonia-MMA mixture in minor proportions. The weight ratio of azomethane to the sum of ammonia and MMA usually varies from 0.01:100 to 10:100, normally from 0.1:100 to 1.0:100. The weight ratio of water introduced to the sum of ammonia and MMA totals from 0.1:1 to 10:1 or more, usually from 1:1 to 8:1. More has little effect except to decrease the capacity of the equipment by the additional water to be removed. The water is suitably admixed in the form of liquid water or steam or in a plurality of portions of each. Steam is suitably used where the added heat is desirable as, for example, in the lower part of a fractionating tower. Liquid water is preferred where additional cooling is desirable, for example, as reflux to the top of a fractionating tower.

The first bottoms stream of MMH and salt, substantially free of AZM is safely worked up for recovery of MMH by known methods. It is suitably charged to an evaporator where salt is crystallized and removed. The aqueous overhead is fractionated in known manner to recover more concentrated or anhydrous MMH.

The separtion of the fixed gases from the synthesis liquor is operated at essentially synthesis pressure, and can be up to about 200 p.s.i.g., usually 150 to 175 p.s.i.g. All of the subsequent operations of this invention are operated under moderate pressure, generally below about 50 p.s.i.g. and most are essentially atmospheric.

Attached FIGURE 1 is a flow sheet of the improved process of the invention Monomethylhydrazine (MMH) synthesis liquor is prepared in 1, substantially as described by Knight in the publication cited above for monomethyl amine (MMA) and aqueous chloramine. The synthesis liquor passes into surge tank 2 acting as a separator for removing overhead fixed gases including largely nitrogen, some unreacted MMA and ammonia. The liquid effluent from surge tank 2 passes via line 11 to distilling column 3. The feed liquor in line 11 contains dissolved MMH, MMA, ammonia, by-product AZM, water and salt. Overhead from column 3 via line 12 a stream of volatile products are removed including MMA, AZM and ammonia. The overhead from column 3 is mixed with steam introduced via line 13, cooled and passed through reflux drum 4 providing reflux to column 3 via line 14 and the feed to column 5 via lines 15, 16 and 10. In order to separate and discard AZM from the system and to recover MMA suitable for recycle, water is added as reflux to column 5 via line 17 and steam via line 18 whereby the overhead in line 19 is a substantially anhydrous stream which contains all of the AZM, nitrogen and substantially all of the ammonia. This overhead is removed from the recovery system. It can be discarded if the values contained therein are deemed to be less than the cost of recovery.

The bottoms from column 5 form an aqueous stream in line 20 containing MMA and minor amounts of ammonia. These bottoms constitute the MMA recycle now substantialy free of AZMl. This stream is suitable for recycle to synthesis stage 1 even though it contains minor amounts of AZM and ammonia. The AZM can safely be recycled in minor amounts since major amounts are eliminated via line 19 and AZM does not accumulate in the recycle.

The bottoms from column 3 contain the MMH as principal product together with water and salt. These pass via line 31 to further processing by known means for the recovery of more concentrated or anhydrous MMH.

Example I

In a system essentially that shown in FIGURE 1, the feed of synthesis liquor to the surge tank amounted to 69 g.p.m. (gallons per minute) and contained mostly water, salt and about 0.6 percent of MMH together with by-products including nitrogen, AZM, excess MMA and ammonia. The gaseous components separated from the synthesis liquor in the surge tank were introduced into column 5 while the aqueous portion of the synthesis liquor passed to column 3. The overhead stream from column 3, operated at 25 p.s.i.g. and a bottom temperature of 120° C., amounted to about 15 g.p.m. and contained substantially all of the unreacted MMA and ammonia together with the AZM. It was mixed with steam and condensed, using a portion of the condensate as reflux to column 3 while the remaining liquid and the uncondensed gases were charged to column 5. Fresh water was fed as reflux to this column which was heated with open steam. AZM and ammonia were driven overhead, providing an MMA rich bottoms suitable for recycle. The overhead was discarded.

The aqueous effluent from the bottom of column 3 contained substantially all of the MMH product. This effluent was charged at the rate of about 56 g.p.m. to further processing for anhydrous MMH. The total amount of water added as liquid water and steam via lines 13, 17 and 18 bore a weight ratio to the ammonia-MMA in line 12 of 7.5:1.

What is claimed is:

1. In a process for the manufacture of monomethylhydrazine wherein a synthesis liquor is formed by reacting chloramine and excess monomethyl amine in aqueous solution and said synthesis liquor is fractionally distilled to form an essentially anhydrous first overhead stream and a first aqueous bottoms stream, said first anhydrous overhead stream consisting essentially of ammonia, monomethyl amine and azomethane, said aqueous first bottoms stream consisting essentially of monomethylhydrazine and water; wherein said first overhead stream is distilled to recover monomethyl amine for recycle and wherein said first bottoms stream is distilled to recover monomethyl hydrazine; the improvement of admixing water with said anhydrous first overhead stream to form an aqueous mixture consisting essentially of water, ammonia, monomethyl amine and azomethane and fractionally distilling said aqueous mixture to remove a second overhead stream containing said ammonia and said azomethane and a second bottoms stream consisting essentially of water and monomethyl amine.

2. The process of claim 1 in which the weight ratio of said water admixed with said first overhead stream to said first overhead stream is at least 0.5:1; said water is admixed in plural portions, the first of said portions being steam; said second overhead stream contains a major proportion of ammonia and a minor proportion of azomethane, said minor proportion of azomethane amounting to a major proportion of the azomethane in said first overhead stream; removing and recycling to said synthesis liquor a second bottoms stream from fractionally distilling said aqueous mixture.

3. The process of claim 1 in which said first overhead stream contains a major proportion of ammonia and monomethyl amine and a minor proportion of azomethane.

4. The process of claim 1 in which said second overhead stream contains a major proportion of ammonia and a minor proportion of azomethane, said minor proportion of azomethane amounting to a major proportion of the azomethane in said first overhead stream.

5. The process of claim 1 in which the weight ratio of said water admixed with said first overhead stream to said first overhead stream is at least 0.5:1.

6. The process of claim 5 in which said water is admixed in plural portions, at least one of said portions being steam and at least one of said portions being liquid.

7. The process of claim 6 in which the first of said portions is steam.

(References on following page)

References Cited

UNITED STATES PATENTS

| | | | |
|---|---|---|---|
| 3,012,948 | 12/1961 | Horvitz et al. | 260—583 X |
| 3,098,017 | 7/1963 | Walter et al. | 260—583 X |
| 3,219,550 | 11/1965 | Horvitz | 260—583 X |

FOREIGN PATENTS

| | | |
|---|---|---|
| 884,635 | 12/1961 | Great Britain. |
| 889,705 | 2/1962 | Great Britain. |

FLOYD D. HIGEL, *Primary Examiner.*